US008774093B2

(12) United States Patent
Roy et al.

(10) Patent No.: US 8,774,093 B2
(45) Date of Patent: Jul. 8, 2014

(54) SYSTEM AND METHOD FOR PROVIDING MOBILITY MANAGEMENT AND OUT-OF-COVERAGE INDICATION IN A CONVENTIONAL LAND MOBILE RADIO SYSTEM

(75) Inventors: Arindam Roy, Plano, TX (US); Linda Trine, Keller, TX (US); Marshall Jobe, Fort Worth, TX (US)

(73) Assignee: E.F. Johnson Company, Irving, TX (US)

( * ) Notice: Subject to any disclaimer, the term of this patent is extended or adjusted under 35 U.S.C. 154(b) by 315 days.

(21) Appl. No.: 13/174,507

(22) Filed: Jun. 30, 2011

(65) Prior Publication Data

US 2012/0002588 A1 Jan. 5, 2012

Related U.S. Application Data

(60) Provisional application No. 61/398,919, filed on Jun. 30, 2010.

(51) Int. Cl.
*H04W 4/00* (2009.01)

(52) U.S. Cl.
USPC .......................................... 370/328

(58) Field of Classification Search
None
See application file for complete search history.

(56) References Cited

U.S. PATENT DOCUMENTS

| | | | |
|---|---|---|---|
| 6,161,016 A * | 12/2000 | Yarwood | 455/445 |
| 7,596,194 B2 | 9/2009 | Janky | |
| 7,889,846 B2 | 2/2011 | Beard et al. | |
| 1,026,328 A1 | 10/2011 | Korus et al. | |
| 8,126,494 B2 | 2/2012 | Shaffer et al. | |
| 2005/0037794 A1 | 2/2005 | Namm et al. | |
| 2005/0277383 A1 | 12/2005 | Reid | |
| 2007/0072554 A1 | 3/2007 | Janky | |
| 2008/0207260 A1 * | 8/2008 | Dent | 455/556.1 |
| 2009/0175209 A1 * | 7/2009 | Roy et al. | 370/312 |
| 2010/0177661 A1 | 7/2010 | Dailey | |

OTHER PUBLICATIONS

Co-pending U.S. Appl. No. 13/210,211, filed Aug. 15, 2011; inventor: Roy et al.

* cited by examiner

*Primary Examiner* — Yong Zhou
(74) *Attorney, Agent, or Firm* — Gardere Wynne Sewell LLP

(57) ABSTRACT

The present disclosure provides a system and a method for providing mobility management and out-of-coverage indication in a conventional Land Mobile Radio (LMR) system. A radio provides its location and user group data to the disclosed system through its traffic channel when the channel is idle. Knowledge of the radio's current location and user group data is used to provide dynamic call routing and data management within the disclosed system. The disclosed system and method may provide operability similar to that of a trunking system by providing mobility management and out-of-coverage indication while providing low-cost benefits through operation of a conventional system.

34 Claims, 6 Drawing Sheets

# SYSTEM AND METHOD FOR PROVIDING MOBILITY MANAGEMENT AND OUT-OF-COVERAGE INDICATION IN A CONVENTIONAL LAND MOBILE RADIO SYSTEM

CROSS-REFERENCE TO RELATED APPLICATIONS

Pursuant to 35 U.S.C. §119(e), this application claims priority from, and hereby incorporates by reference for all purposes, U.S. Provisional Patent Application Ser. No. 61/398,919, entitled "System and Method for Providing Mobility Management and Out-of-Coverage Indication in a Conventional Land Mobile Radio System," filed Jun. 30, 2010, and naming Arindam Roy, Linda Trine, and Marshall Jobe as inventors.

TECHNICAL FIELD

The present invention relates generally to Land Mobile Radio (LMR) systems and, more specifically, to a system and method that allows users operating in a conventional system, such as, for example, a Project 25 conventional system, to achieve mobility management and out-of-coverage indication.

BACKGROUND

Land Mobile Radio (LMR) systems are deployed by organizations requiring instant communication between geographically dispersed and mobile personnel. Typical users of LMR systems include police departments, fire departments, medical personnel, security personnel, EMS, and the military.

Current LMR systems can be configured to provide for radio communications between one or more sites and subscriber radio units in the field. A subscriber radio unit (hereinafter "radio") may be a mobile unit or a portable unit. LMR systems can be as simple as two radio units communicating between themselves and a site over preset channels, or they can be complex systems that include hundreds of radio units and multiple sites.

LMR systems can be broadly divided into two classes: (1) trunking LMR systems; and (2) conventional LMR systems. A trunking system generally includes one or more trunking sites and dispatch control centers. FIG. 1 illustrates a typical trunking LMR system 100 including a trunking site 104 and a dispatcher 108. The trunking site 104 includes a control channel 112 and one or more traffic channels (e.g., 116, 118). Typically a group of radio users (e.g., 124, 128) create a user group to communicate with each other and the dispatcher 108. In a trunking system 100 there can be multiple radio users and multiple user groups.

Trunking systems streamline usage of Radio Frequency (RF) resources (e.g., traffic channels) through the use of mobility management. Mobility management allows the system to send periodic messages to the radios through a dedicated radio frequency base station, also known as a control channel, while the radios communicate back with the system. Said periodic messages may indicate coverage availability, signal strength, and other data to the radio, while communication from the radio may indicate to the system the radio's location and interested user group. If the radio stops receiving the messages from the control channel 112, the radio notifies the user, typically through visual and audible indicators, that the radio is outside of the coverage zone of the trunking system.

Mobility management allows dynamic routing of "Push-to-Talk" user group calls based on user availability in different geographic locations. Therefore, trunking systems implement mobility management to allow a radio unit to move from one geographic region to another while the system keeps track of the unit's location and user group affiliation within the unit's current geographic region. When a radio user wants to contact other radio users or a dispatcher in the same user group, the radio user sends a request to a trunking site controller 132 through the control channel 112. The trunking site controller 132 contacts the other trunking sites interested in the same user group. The trunking site controller in each interested site allocates an available traffic channel. Once a channel is available, the radio users in the user group are notified through the control channel, and their radios are placed in communication with the appropriate traffic channel to communicate with each other. Since a traffic channel is allocated dynamically on a per call basis, a trunking system provides efficient utilization of available bandwidth and RF resources.

Although trunking systems provide efficient usage of RF resources, it is achieved at significant costs. Specifically, the control channel required to provide communication of user location from the radios to the system is expensive. When cost is of concern, a conventional LMR system may be a preferred solution since the conventional system lacks the expensive control channel.

A conventional system allows the radio users to directly access a traffic channel, if available, and originate voice communication. FIG. 2 illustrates a conventional LMR system 200. Like the trunking system 100, the conventional LMR system 200 may include one or more conventional sites, although only one conventional site 204 and dispatcher 208 is shown in FIG. 2. However, unlike the trunking site 104, the conventional site 204 does not include a control channel. The conventional site 204 includes one or more traffic channels (e.g., 216, 220 and 224) each traffic channel being typically assigned to one or more user groups for use by radios, such as radio 228 and radio 232. The members of a user group may communicate with each other on the same traffic channel, thus allowing the users and the dispatcher to instantly communicate with each other without waiting for the system to allocate a traffic channel.

Although a conventional system may be more economical, one of its disadvantages is that the absence of a control channel precludes the system from sending periodic coverage indication messages to the radios, and the radios are unable to inform the system of its location or interested user group—features typically associated with mobility management as discussed above. Therefore, the system is unable to intelligently route originating traffic to select destination sites based on user availability, and the radio is unable to indicate to the user that the radio is outside of the coverage zone of the conventional system. As a result, a conventional system implements preconfigured routing to route the call from the originating radio to a fixed set of geographic locations, regardless of user availability in those sites. Accordingly, RF resources are typically wasted or inefficiently allocated when a user is not available in a site. While a conventional system may provide an initial lower cost LMR system solution, the lack of mobility-based routing and out-of-coverage indication limits the usage and capabilities of the system.

SUMMARY

The present disclosure provides a system and a method for providing mobility management and out-of-coverage indication in a conventional system, thus maintaining the lower initial costs associated with a conventional system while concurrently enhancing the system to provide operation similar to that of a trunking system.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures, in which like reference numbers indicate similar parts, and in which.

DETAILED DESCRIPTION OF THE DRAWINGS

The present disclosure provides a system and a method for providing mobility management and out-of-coverage indication in a conventional LMR system. The disclosed system and method allows operability similar to that of a trunking system by providing mobility management and out-of-coverage indication while providing, in certain implementations, low-cost benefits through operation of a conventional system.

Figure 1:
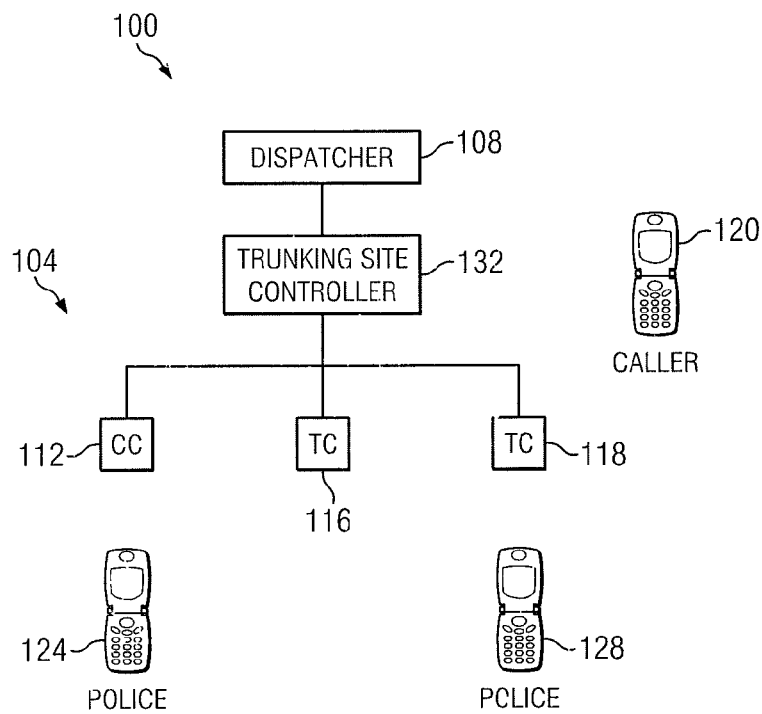
FIG. 1 is an illustration of an exemplary trunking LMR system.
Figure 2:
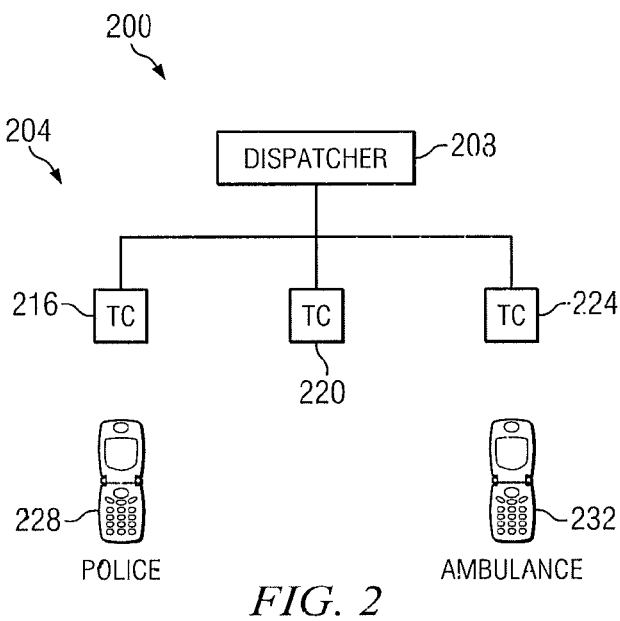
FIG. 2 is an illustration of an exemplary conventional LMR system.
Figure 3:
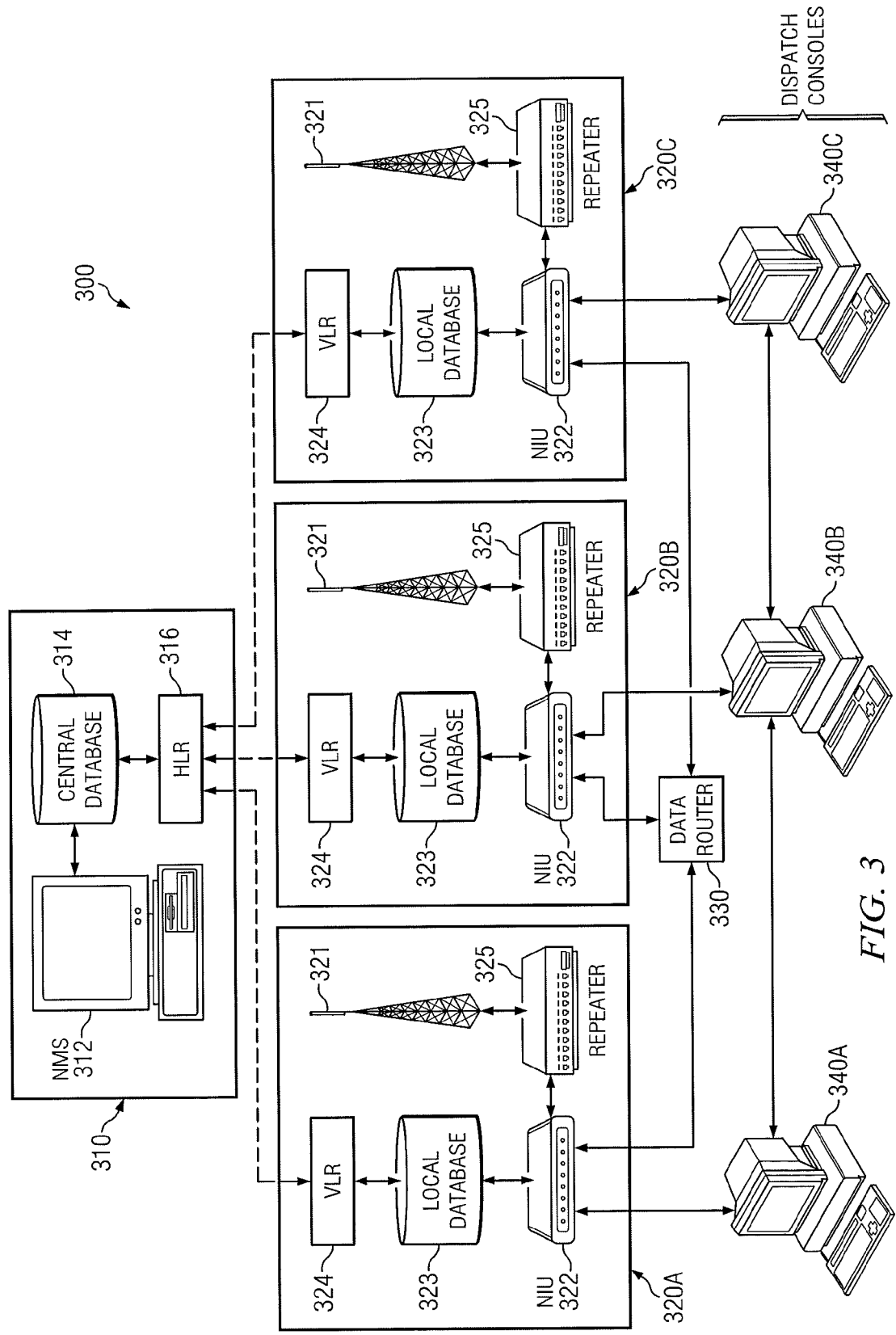
FIG. 3 is a general illustration of an exemplary embodiment of the disclosed system.

FIG. 3 provides an overview of an exemplary embodiment of the system 300 disclosed herein. The exemplary system 300 shown in FIG. 3 includes a home location 310 and conventional LMR sites 320A, 320B, and 320C (also referred to herein as "sites"). The system 300 may comprise a data router 330, and dispatch consoles 340A, 340B, and 340C. When reference is made herein to a generic site or to all the sites, reference number 320 may be used; otherwise, when reference is made to a specific site, the corresponding site reference number (e.g. 320A, 320B, or 320C) may be used. Additionally, the term "local site" may be used herein to reference a single site of interest without defining the site of interest as a particular site, and the term "remote site" may be used to refer to a site other than the local site. When reference is made to a generic dispatch console or to all the dispatch consoles, reference number 340 may be used; otherwise, when reference is made to a specific dispatch console, the corresponding dispatch console reference number (e.g., 340A, 340B, or 340C) may be used. Although FIG. 3 only shows three sites 320 and dispatch consoles 340, it should be understood that the system 300 may accommodate a lesser or greater number of sites 320 and dispatch consoles 340.

In an embodiment of the present disclosure, the home location 310 may include a network management system (NMS) 312, central database 314 and home location register (HLR) 316. In general, the NMS 312 supports system-wide configuration of all components in the system 300, as well as statistics tracking, alarm tracking, and other system management functionality; the central database 314 stores data; and the HLR 316 works together with a visitor location register (VLR) located at or assigned to each site 320 to track user group data and the location of all radios in the system 300. In some embodiments, the central database 314 may be combined, partitioned or associated with the NMS 312 and/or HLR 316.

Each site 320 handles communications with and between radios and the system 300. In an embodiment of the present disclosure, each site 320 may include a radio tower 321, a network interface unit (NIU) 322, a local database 323, a VLR 324, and a repeater 325 such as, for example, the 2600 Series Repeater manufactured by EF Johnson. The repeater 325, in this embodiment, receives and transmits digital and/or analog signals between the radios (not shown in FIG. 3) and the local site 320. The radio tower 321 provides a communication medium between the repeater 325 and the radios. Although it is not shown in FIG. 3, the NIU 322 may house site applications (e.g., site controller application, channel controller application, inter-site router application, and 2/4-wire interface application). The NIU 322 and its internal applications perform radio and user group validation functions as well as coordinate inter-site calls between radios and/or calls between 2 or 4-wire devices such as, for example, tone remotes or analog repeaters. The VLR 324 and local database 323 may reside within the NIU 322; however, they are shown separately in FIG. 3 (and the following figures) in order to better illustrate the specific components in the system 300 involved in mobility management. Additionally, although in FIG. 3 each site 320 is shown to have its own NIU 322, VLR 324 and local database 323, in other embodiments multiple sites 320 may share a single NIU 322, VLR 324 and local database 323.

The data router 330 is operable to communicate with the NIU 322 located in one or more of the sites 320 to track the location of a radio, and route data between the proper components of the system 300. In some embodiments, the radio location may be considered to be the site to which the radio is communicating, a geographical location, coordinate data such as that provided by a Global Positioning System (GPS), or some combination thereof. The dispatch consoles 340 are operable to communicate with their respective sites 320 and other dispatch consoles 340 to determine whether radios belonging to a specific user group are located at a particular site 320, and to direct communication between each of the sites 320. Although tracking of a radio may be provided by the data router 330, in some embodiments, this functionality may be provided by other components such as, for example, the HLR 316.

Typically, a radio is considered to be within coverage of the system 300 when it is operable to communicate with one or more of the sites 320 in the system 300. Although a radio may be outside the coverage zone of a particular site 320, it may still be considered within coverage of the system 300 as long as the radio is within coverage of at least one of the other sites 320 in the system 300. A radio within coverage is operable to communicate with the system 300 and other radios, whereas a radio out-of-coverage is unable to communicate with the system 300 and other radios. In accordance with an embodiment of the present disclosure, a radio operating within the disclosed system 300 may provide an audible, visual, vibration, or some other out-of-coverage indication to alert the user that the radio is outside the coverage zone of the system 300.

In accordance with the present disclosure, when a specific component corresponding to a specific site 320 is referenced, the component may be referenced according to the specific site 320 in which the component is located by appending the letter associated with the specific site to the component's generic reference number. For example, the generic reference number for a local database is "323." If reference is made to the local database of site 320A, the local database may be referenced as "323A." Accordingly, if reference is made to the local databases of sites 320B and 320C specifically, the local databases may be referenced as "323B" and "323C," respectively. Unless indicated otherwise, when a component is referenced by its generic reference number, it should be understood that the reference may include all, or any one, of the components located within the system 300. For example, in accordance with the previous example, if a local database is referenced by the numeral "323," it should be understood that the reference may include any one, or all, of the local databases in the system 300.

In an embodiment of the present disclosure, the NMS 312 of the home location 310 controls configuration of the system 300. To implement mobility management within the system 300, the NMS 312, in one embodiment, pre-configures all radios operating on the system 300 as well as user group data in the central database 314. The NMS 312 generates radio registration data comprised of a listing of radios that are registered with the system 300 and the user groups that are affiliated with each of the radios. Accordingly, a site 320 may only allow calls to be placed or received by a radio that is configured with the system 300.

Radios that are configured to operate within the system 300 are registered with the system 300 in response to a registration event. A radio may be considered to be registered to the system 300, or more particularly, to a site 320. A registration event may occur automatically when a configured radio "enters coverage of a site" 320, or when the registration event is initiated by the radio. A radio may be registered at a particular site 320 when the radio is turned on while within range of the site 320, or when a radio previously out-of-coverage of the site 320 comes within range of the site 320 so that it is then within coverage. A registration event initiated by a radio may include data registration activities such as, for example, power-on/off of the radio and changing the radio channel or user group.

The radio registration data may be changed dynamically by the system 300 to add and/or remove radios from the system 300 and to change the user group affiliated with a radio. In the present disclosure, radios that are affiliated with a particular user group may be referred to as "belonging to," being "affiliated with," or being a "member of" that particular user group. It should be understood that not all radios may be affiliated with a user group; however, radios may be operable to scan, or listen to, one or more user groups.

In addition, the NMS 312 generates user group data, wherein the user group data may be comprised of a listing of normal user groups, critical user groups, a priority level for each normal and critical user group, and sites for which the normal and critical user groups are enabled. Accordingly, a site 320 may only allow calls to be placed to user groups that are configured with the system 300 and enabled in the site 320.

The NMS 312 also generates critical user group data designating specific sites 320 in which a critical user group is enabled, and a period of time for which they are enabled. The user group data and critical user group data may be changed dynamically by the NMS 312, in one embodiment. For example, the user group data and critical user group data may be changed to add/remove a user group, to select the designation of a user group to be critical or normal, to set/adjust the period of time for which a user group is designated as critical or normal, to set/adjust the priority level of a user group, to set/change the sites enabling a user group, or to set/adjust the period of time for which a critical user group is enabled in a particular site. In some embodiments, the radio registration data, user group data and critical user group data may be stored in at least one of the local database 323 of each site 320 in the system 300, the central database 314, or the data router 330.

Figure 4:
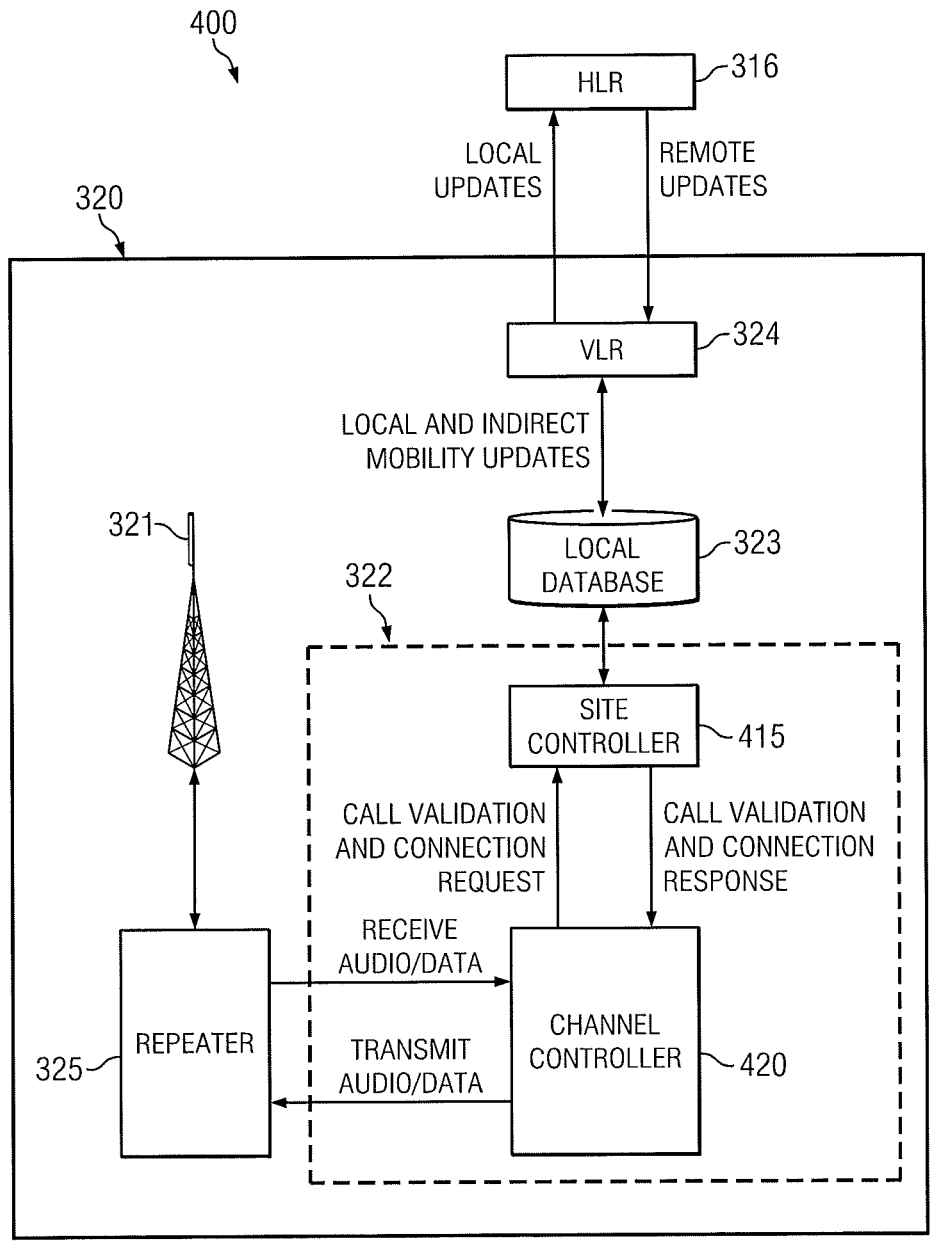
FIG. 4 is a more detailed illustration of a site of the system shown in FIG. 3.

FIG. 4 provides a more detailed illustration of an exemplary embodiment of a site 320 located within the system 300 shown in FIG. 3. The exemplary illustration 400 of FIG. 4 shows a local site 320 having a VLR 324, local database 323, NIU 322, repeater 325, and radio tower 321, wherein the NIU 322, in one embodiment, further comprises a site controller application 415 and a channel controller application 420 (referred to hereinafter as "site controller" and "channel controller," respectively). The site controller 415 is responsible for validation-checking of radios and user groups at the local site 320, whereas the channel controller 420 is operable to control specific traffic channels to support communication with the repeater 325 to transmit and receive audio and data on a selected traffic channel. In FIG. 4, the VLR 324 and local database 323 are shown separate from the NIU 322 to maintain consistency with the system 300 shown in FIG. 3 even though, as previously mentioned, in some embodiments they may reside within the NIU 322.

Calls placed in the system 300 are typically handled within the site 320 in which the call originates, or is placed. As explained below, mobility management allows the system 300 to track the location and user group data of radios located within the system 300. The location and user group data is used by the system 300 to place calls between the radios and user groups. Typically there are two types of calls that may be placed, an individual call or a group call (otherwise referred to as "user group call"). An individual call originates from one radio and connects to one other radio, whereas a group call originates from one radio and connects to one or more radios that are members of the user group for which the call is placed. As used throughout the present disclosure, the term "interested radios" refers to radios that are members of a user group for which a specific call is placed.

Individual calls occurring between a source radio (i.e., the radio placing the call) and a destination radio (i.e., the radio receiving the call) may be classified as a local call or inter-site call, depending upon the location of the destination radio relative to the site 320 within which the call is originated. When the source radio places an individual call at a local site 320, the local channel controller 420 will request a radio validation from the local site controller 415. The local site controller 415 will then look up both the source and destination radios in the local database 323 (or central database 314) to verify that the radios are registered with the system 300. Verification is then sent to the local channel controller 420. If the call is valid (i.e., the source radio and destination radio are both registered with the system 300), the local channel controller 420 will request a call connect from the local site controller 415. If the source radio is not registered with the local site 320 but is configured with the system 300, the source radio's initiation of the call acts as a registration event, whereby the source radio is registered with the local site 320.

Because all databases 323 in the system 300 are assumed to be updated with the location and user group data for each radio in the system 300, in one embodiment, the local site controller 415 may check the local database 323 to determine the destination radio's location. If the destination radio is located in the local site 320, then the call is classified as a local call, meaning the call will remain within the local site 320. However, if the destination radio is located in a remote site (not shown), then the call is classified as an inter-site call, meaning the call will be placed between the local site 320 and the remote site. If the call is an inter-site call, the local site controller 415 may contact the remote site controller (not shown) to set up the call. The local channel controller 420 then routes the call between the local site 320 and the remote site. In an embodiment of the present disclosure, the radios may be configured to allow or disallow individual calls.

By providing radio location and user group data through mobility management, the system 300 tracks not only the location of any radio registered with the system 300, but also which user groups are available to receive a call at each site 320. In an embodiment of the present disclosure, the system 300 dynamically routes group calls and allocates traffic channels based on the location of radios belonging to particular user groups within the system 300. This dynamic call routing and traffic channel allocation may be referred to herein as "user group zoning." For example, in accordance with FIG. 3, if a radio located at a site 320 (e.g. site 320A) places a call for a "Police" user group, the system 300 will check to see if other sites in the system 300 (e.g. sites 320B and 320C) contain radios that are members of the "Police" user group. As previously mentioned, the term "interested radio" refers to a radio belonging to a user group of a call that has been placed. Sites 320 containing interested radios (i.e., radios that are members of the "Police" user group) allocate traffic channels for the call; otherwise the site 320 ignores the call by not allocating traffic channels for the call. User group zoning allows each site 320 in the system 300 to reserve RF resources by only allocating traffic channels for a user group call if there are interested radios on the site 320. The details of user group zoning and group calls are described below.

When a group call is placed at a local site 320 in the system 300, the local channel controller 420 may request a radio and user group validation from the local site controller 415. The local site controller 415 will then look up both the source radio and the user group in the local database 323 (or central database 314) to verify that the source radio is registered with the system 300 and the user group is registered with the system 300 and enabled at the local site 320. Verification is then sent to the local channel controller 420. If the call is valid (i.e., the source radio is registered with the system 300 and the user group is valid in the system 300 and enabled in the local site 320), the local channel controller 420 will request a call connect from the local site controller 415.

Since the local database 323 contains a listing of all radios, their location within the system 300, and their user group affiliation, and the user group data located in the local database 323 contains a listing of all sites in the system 300 that enable the user group of the call being placed and whether the user group is designated as normal or critical for each site 320 enabling the user group, the local site controller 415 may determine if the call will remain local, or if it will need to connect an inter-site call with other sites 320 in the system 300. If an inter-site call is necessary, the local site controller 415 may contact the remote site controller in each site participating in the call to set up the call. The local channel controller 420 then routes the call between the local site 320 and each site 320 participating in the call. The process for determining if a site may participate in a call is explained in greater detail below.

A site 320 may be determined to participate in the call based on the following criteria. If the site 320 is affiliated with the user group of the call, and the user group is designated as a normal user group for the site 320, then the site 320 may allocate traffic channels to participate in the call if the site 320 has an interested radio. However, when a user group is designated as critical for the site 320, the site 320 will always, in one embodiment, allocate resources for a call originating anywhere in the system 300 when the call is placed for the critical user group, even if the site 320 has no interested radios when the call is placed. The use of critical user groups allows for a radio belonging to a critical user group to move from one site 320 directly to another site 320 recognizing the user group as critical without dropping a call, even if there were no interested radios at the new site 320 when the call was placed. The possible additional bandwidth is reserved because of the "critical" nature and importance of the call and the need for added reliability.

A call that is already in process may be received at a new site 320 not currently allocating resources for the call if an interested radio moves to the new site 320 (regardless of whether the interested radio is participating in the call already in process), or a radio already on the new site 320 provides a mobility update to the system 300, wherein the mobility update includes the user group for the call currently in process. When this occurs, the site 320 may allocate resources (if available) for the call, thereby allowing the radio to continue the call uninterrupted. Accordingly, a call requiring resources to be allocated dynamically at a new site 320 as just described is assumed to be a normal group call since a critical group call would already have resources allocated at the new site 320.

To support mobility management, data is transmitted to and from each radio registered with the system 300 when the current traffic channel of a given radio is idle. This data may include a mobility update, a status message, or any other data communicated between the radio and components within the system 300. In one embodiment of the present disclosure, the system 300 sends periodic data packets to each radio within the system 300 at a configured period of time (e.g., every two minutes), wherein the periodic data packets may be sent regularly at the configured time, or only when no voice or data traffic has been detected on a radio's traffic channel for the configured period of time. Receipt of any data or voice communication by the radio confirms to the radio that it is within coverage of the system 300. However, if the radio fails to receive any data or voice communication within a given period of time (e.g., 5 minutes), the radio assumes that it is no longer within coverage of the system 300. Accordingly, the radio may be programmed to provide an "out-of-coverage" indication to alert the radio operator that the radio is no longer within coverage of the system 300. The out-of-coverage indication may include any combination of an audible, visual, and/or vibration indication. The out-of-coverage indication may continue until data or voice communication is received by the radio.

Radios operating within the system 300 may also be configured to support channel and/or user group scanning (otherwise referred to herein as "radio scanning"). Radio scanning allows radios to listen for activity of a number of preconfigured channels and/or user groups while the radio's current traffic channel is idle. It should be noted that during radio scanning, the radio's current traffic channel and user group are not changed; therefore, if communication is initiated by the radio during the radio scan, and the communication is not in response to channel activity on one of the scanned channels/user groups, the radio will use its currently-selected traffic channel and user group. However, if during the scan, communication is initiated by the radio in response to activity on one of the scanned channels/user groups, the radio, in one embodiment, will temporarily switch its transmitter to the scanned channel/user group so the communication will be transmitted to/from the channel/user group on which the activity was detected. After a period of inactivity on the channel/user group on which the activity was detected, the radio will revert back to its original traffic channel and user group and will continue scanning.

Because radios may scan multiple user groups, a single radio may be considered an interested radio for more than one user group or group call (when the radio is scanning). Therefore, if a radio is already participating in a group call, the radio may choose to ignore a new group call detected on its scanning channels/user groups if the new group call is of a lower priority than the group call in which the radio is already participating.

The system 300, in certain embodiments, may be able to perform several functions over the air with respect to activity of a specific radio. For example, the system 300 may be able to verify over the air whether or not a radio is operational (i.e., on, functional, and within coverage) by sending a "radio check" command, and the system 300 may be able to disable or enable communication of a specific radio by sending a "radio inhibit/uninhibit" command. When a radio check command is requested, the NMS 312 may send the command to various VLRs 324 in the system 300. The VLRs will forward the command to each local site 320 for transmission over the air to the radio. The radio will respond with a "Radio Check Acknowledged" signal sent to the radio's local VLR 324, which forwards the response to the HLR 316. The HLR 316 updates the central database 314 with the response. Receipt of the radio check acknowledged signal confirms to the system 300 that the radio is, indeed, operational.

The system 300 is able to disable an enabled radio by requesting a radio inhibit command. When a radio inhibit command is requested, the NMS 312 sends a radio inhibit control message to various VLRs 324 in the system 300. Each VLR 324 forwards the radio inhibit control message to its respective local site 320. Each site 320 then transmits the radio inhibit control message until a "radio inhibit complete" control message is received by the site's local VLR 324. The radio inhibit control message is transmitted by the site 320 to the radio addressed by the control message. Once received, the radio sends a "radio inhibit acknowledged" message to its local site 320, which sends a radio inhibit complete message to the local VLR 324. The VLR 324 forwards the radio inhibit complete message to the HLR 316, which propagates the message to various VLRs 324 in the system 300. When a VLR 324 receives a radio inhibit complete message, it will send a request to its local site 320 to stop transmitting the radio inhibit control message.

The system 300 is also able to enable a disabled radio by sending a radio uninhibit control message to the disabled radio. When a radio uninhibit command is requested, the NMS 312 sends a radio uninhibit control message to each VLR 324 in the system 300. Each VLR 324 forwards the radio uninhibit control message to its respective local site 320. Each site 320 then transmits the radio uninhibit control message until a "radio uninhibit complete" control message is received by the site's local VLR 324. The radio uninhibit control message is transmitted by the site 320 to the disabled radio addressed by the control message. Once received, the radio is enabled and sends a "radio uninhibit acknowledged" message to its local site 320, which sends a radio uninhibit complete message to the local VLR 324. The VLR 324 forwards the radio uninhibit complete message to the HLR 316, which propagates the message to all VLRs 324 in the system 300. When a VLR 324 receives a radio uninhibit complete message, it will send a request to its local site 320 to stop transmitting the radio uninhibit control message.

Mobility management, in one embodiment, allows the system 300 to track the location of a radio, when the radio accesses the system 300 from any site 320, by receiving from the radio, in one embodiment, time-stamped location and/or user group data packets known as "mobility updates." Transmission of the mobility updates may occur once the radio detects that the current traffic channel is idle. The term "mobility update" may be used throughout the present disclosure to refer to the time-stamped data packets containing radio location and/or user group data, whereas the term "mobility update event" may be used to refer to the act of sending and/or receiving a new mobility update between components of the system 300. Additionally, the term "local mobility update event" refers to a mobility update event originating within a local site 320, whereas the term "remote mobility update event" refers to a mobility update event originating outside the local site 320. In local mobility update events, mobility updates may be pushed to the HLR 316 from the VLR 324 of the local site 320 for distribution to the rest of the system 300, whereas in remote mobility update events, mobility updates may be pushed down to the VLR 324 of the local site 320 by the HLR 316. For simplicity, mobility updates are described herein as having "location and user group data;" however, it should be appreciated that although mobility updates typically include both location and user group data, in some embodiments, the mobility update may not include one of the location data or the user group data.

The location and user group data provided in a mobility update may be stored in multiple components of the system 300. For example, the location and user group data may be stored in the central database 314, local databases 323, and/or data router 330. In some embodiments, the location and user group data may even be stored in an internal memory or register located in the HLR 316 and VLRs 324. In accordance with the present disclosure, when reference is made to knowledge of a radio's location and user group data by the system 300, it should be understood that the data may be stored in multiple locations within the system 300 as described above.

In an embodiment of the present disclosure, local mobility update events will trigger the local VLR 324 to push the mobility updates to the HLR 316, in one embodiment, when the mobility update indicates a change in the location, such as movement from one site 320 to another site 320, or a change in the user group data of the radio initiating the mobility update. Remote mobility updates received at the HLR 316, from other VLRs in the system, will trigger the HLR 316 to push the mobility updates down to the VLR 324, which will update the local database 323. Mobility update events are described in greater detail below.

Mobility update events may be initiated in response to a registration event occurring at a site 320, or in response to radio activities such as, for example, initiating a "Request-to-Talk" (RTT), emergency alarm transmission, status message transmission, and "Push-to-Talk" (PTT). These radio activities are referred to as implicit registration events because operation of the event may indicate that the radio is registered with the site 320; however, if the radio is not registered, the implicit registration event will trigger the registration of the radio with the site 320 if the radio is configured with the system 300.

In general, a mobility update event may be initiated by a radio when there is a change in the radio's location or user group data, or if the radio incurs a power-on/off, change of channel, RTT, emergency alarm transmission, status message transmission, PTT, or other events that result in a change to the operation or status of the radio. Additionally, it should be appreciated that a mobility update event may be initiated in response to events other than those provided herein; and therefore, may be initiated not only by the radio itself, but also by components within the system 300. For example, a dispatch console 340 may command a site 320 to request mobility updates from all radios located at the site 320.

Figure 5:
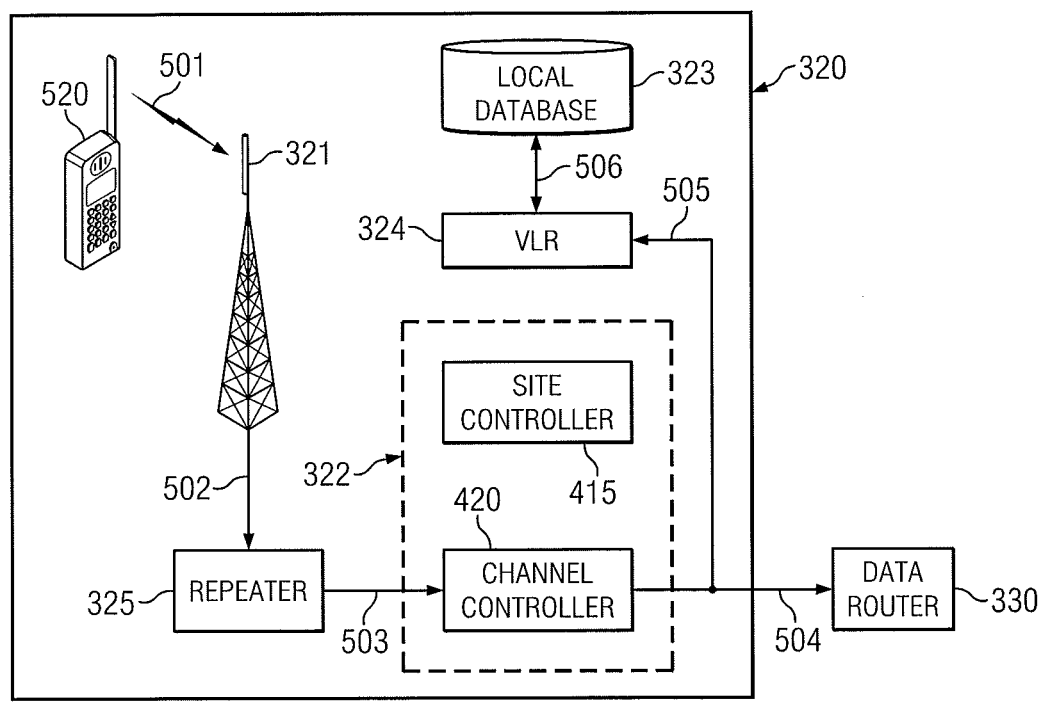
FIG. 5 illustrates the steps and components involved in an exemplary initial check of a mobility update event occurring within a local site.

As described above, local mobility update events take place within a local site 320 upon occurrence of any one of several events (i.e., radio enters coverage of the site 320, radio powers on or off, radio channel is changed, etc). When a local mobility update event occurs in one implementation, an initial check is performed at the local site 320 to determine whether the mobility update contains a change in the location or user group data already known for the radio initiating the local mobility update event. FIG. 5 illustrates the steps and components involved in an exemplary initial check of a local mobility update event.

In step 501, a radio 520 initiates a local mobility update event by transmitting a mobility update across a traffic channel when the traffic channel is idle. The mobility update is received by the radio tower 321 and transmitted to the repeater 325 in step 502. In step 503, the repeater 325 transmits the mobility update to the channel controller 420. The channel controller 420 transmits the mobility update to the data router 330 and VLR 324 in steps 504 and 505, respectively. Although steps 504 and 505 are shown separately in FIG. 5, it should be understood that these steps may occur simultaneously as a single event. In step 506, the VLR 324 updates the local database 323 with the radio 520 user group data (e.g. user group affiliation) and location data (i.e., site affiliation data) contained in the mobility update. In the present embodiment, the location and user group data of the radio 520 is stored in both the data router 330 and the local database 323. If the pre-existing data in the local database 323 matches the data contained in the mobility update, then the initial check process ends here since there has been no change to the radio's location or user group data. However, if the mobility update contains different radio location or user group data, then the local site 320 will push the mobility update up to the rest of the system 300 as explained below and illustrated in FIG. 6.

Figure 6:
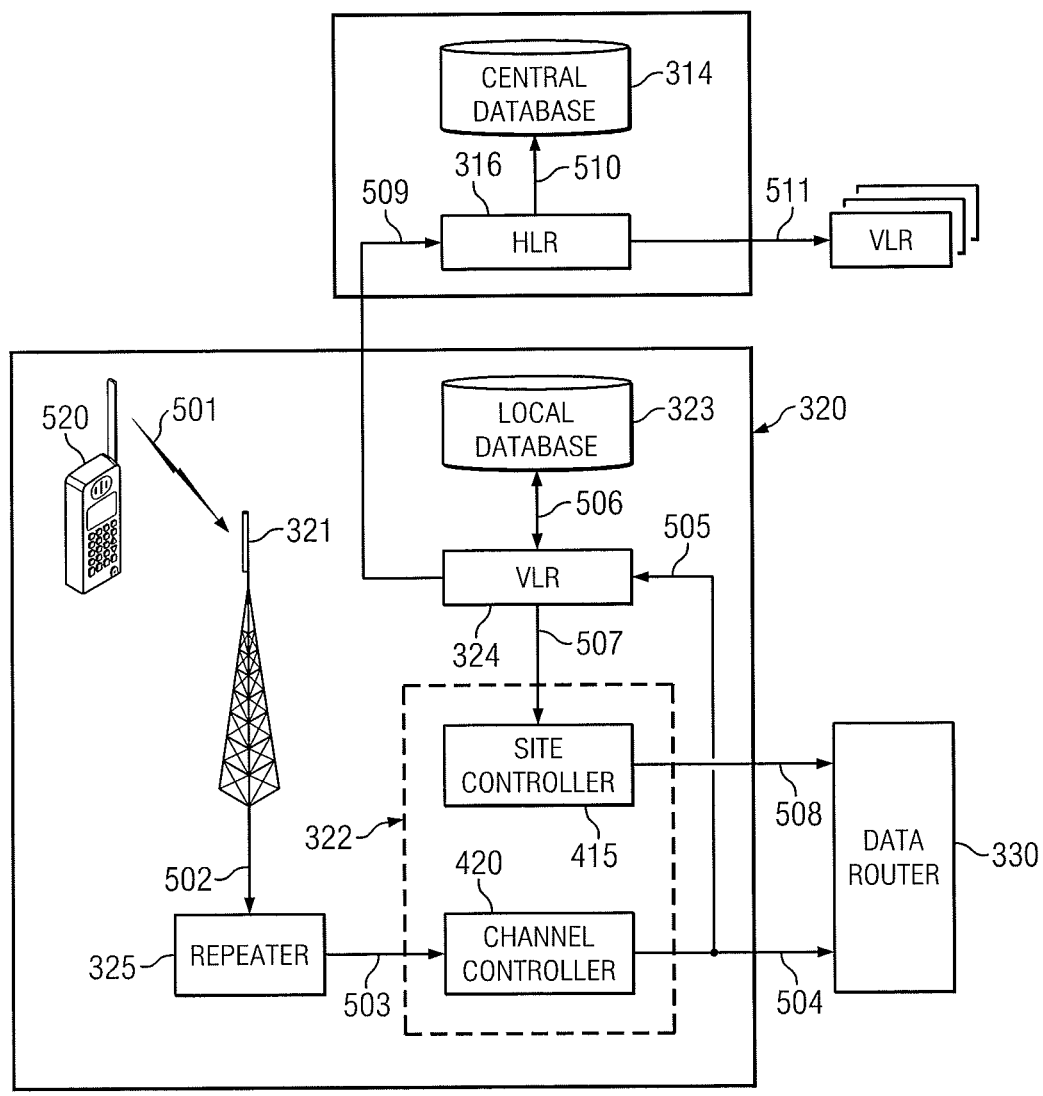
FIG. 6 is an updated version of FIG. 5 illustrating the steps and components involved in an exemplary mobility update event after it has been determined that the mobility update is to be pushed to the rest of the system.

FIG. 6 is an updated version of FIG. 5 illustrating the steps and components of FIG. 5 as well as the steps and components involved in an exemplary mobility update event after it has been determined that the mobility update contains new location or user group data, and therefore is to be pushed to the rest of the system 300. After updating the local database 323 with the new location and/or user group data as described above, the VLR 324 sends a command to the site controller 415 to send the location data contained in the mobility update to the data router 330 in steps 507 and 508. The VLR 324 then pushes the mobility update to the HLR 316 in step 509. Upon receipt of the mobility update, the HLR 316 updates the central database 314 with the mobility update in step 510. In step 511, the HLR 316 pushes the mobility update to other VLRs in the system 300. Although it is not illustrated in FIG. 6, upon receipt of the mobility update, the other VLRs in the system 300 update their respective local databases with the mobility update. It should be noted that, with respect to the VLRs in the other sites, this mobility update event would be considered a remote mobility update event since it originated from another site. Updating all respective local databases 323 in response to the mobility update ensures that databases 323 within the system 300, the central database 314, and the data router 330 are updated with the mobility update from the radio 520 initiating the mobility update event.

Although it is not illustrated in FIGS. 3-6, in some embodiments, upon receiving a mobility update, the HLR 316 may push the mobility update to all VLRs 323 in the system 300, including the local VLR 323 originally providing the mobility update to the HLR 316. In this embodiment, the local VLR 323 may not send a command to its local site controller 415 to send the location data to the data router 330 until after it receives the mobility update from the HLR 316.

In an example in accordance with the embodiments illustrated in FIGS. 3-6, if a radio 520 is powered on within range (coverage) of site 320A, the radio 520 initiates a mobility update event—in this case, the mobility update could be initiated by a registration event resulting from the power-on of the radio 520. It should be noted that this registration event prompts the site controller 415 to validate the radio 520 and its user group. The radio 520 monitors its current traffic channel for activity and transmits the mobility update through the radio tower 321 to the router 325 when the traffic channel is idle. The router 325 then sends the mobility update to the channel controller 420, which sends the mobility update to the VLR 324 and data router 330. The VLR 324 then stores the mobility update in the local database 323A. With respect to site 320A, the initiation of the mobility update is considered a local mobility update event.

If the mobility update provides new location or user group data, the VLR 324A sends a command to the site controller 415A to send a data registration packet to the data router 330. The VLR 324A then pushes the mobility update to the HLR 316 where it is stored in the central database 314. The HLR 316 then pushes the mobility updates to VLRs 324B and 324C. Upon receipt of the mobility update, the VLRs 324B and 324C then store the mobility update in local databases 323B and 323C, respectively. With respect to sites 320B and 320C, receipt and storage of the mobility update is considered a remote mobility update event since the mobility update originated from site 320A. Accordingly, local databases 323A, 323B and 323C, and central database 314 contain the mobility updates and, thus, are up-to-date.

In one implementation, a site 320 may send periodic information packets to the NMS 312, to which the NMS 312 replies with an acknowledgement confirmed or failed signal thereby indicating whether or not a proper connection exists between the site 320 and the home location 310. Consequently, both the site 320 and the NMS 312, and thus, the home location 310, may detect loss of a connection. Additionally, when a VLR 324 and the HLR 316 communicate, each provides confirmation, or acknowledgement, that communication was received. Thus, a site 320 may determine that the HLR 316 is nonresponsive, or down, when the VLR 324 fails to receive confirmation from the HLR 316; and the HLR 316 may determine that the VLR 324 is nonresponsive when the HLR 316 fails to receive confirmation from the VLR 324. Accordingly, two communication error conditions may exist: 1) the HLR 316 is down, and thus, is disconnected from (and unable to communicate with) all VLRs 324 in the system 300; and 2) a VLR 324 is down, and thus, is unable to communicate with the HLR 316 and other VLRs 324. If a connection between a site 320 and the home location 310 is lost, each disconnected site 320 may operate using its respective local database 323 in a stand-alone mode as described below.

In the first condition, wherein the HLR 316 is down and is unable to communicate with all VLRs 324 in the system 300, a VLR 324 may send mobility updates directly to other VLRs 324 within the system 300 for storage in their respective local databases 323 by sending a multicast mobility update. For example, in accordance with FIG. 3, if a local mobility update event occurs at site 320A, and the VLR 324A is unable to communicate with the HLR 316, the VLR 324A may transmit the mobility update directly to VLRs 324B and 324C for storage in local databases 323B and 323C.

Once the HLR 316 is reconnected with the VLRs 324, a synchronization process between each reconnected VLR 324 and the HLR 316 may occur, wherein the central database 314 is updated with the mobility updates stored in the local databases 323 of the reconnected VLRs 324. Because the mobility updates are time-stamped, the system 300 may confirm that the most recent mobility updates are stored in all databases (local databases 323 and central database 314) within the system 300.

In accordance with the second condition, wherein a VLR 324 is down and is disconnected from the HLR 316 and other VLRs 324, if the HLR 316 is aware of the existence of the disconnected VLR 324, mobility updates, which may include radio data such as radio location data or radio user group data, received from other connected VLRs 324 may be queued in the HLR 316 until communication is reestablished with the disconnected VLR 324. Once communication is reestablished, the mobility updates are pushed to the reconnected VLR 324. If the HLR 316 is unaware of the disconnected VLR 324, upon connection, the local database 323 of the previously disconnected VLR 324 will be synchronized with the mobility updates of the central database 314.

It should be appreciated by those of ordinary skill in the art, that certain components of the system 300 may be integrated with others without departing from the scope of the application as set forth in the claims below. For example, the home location 310 may not include a separate central database 314. As such, information that is disclosed as being stored in the central database 314, may alternatively be stored in an onboard memory or register located in the HLR 316. Additionally, certain components, modules and functions may be integrated into one unit or separate. For example, in some embodiments, the data router 330 may be combined with the HLR 314.

Figure 7:
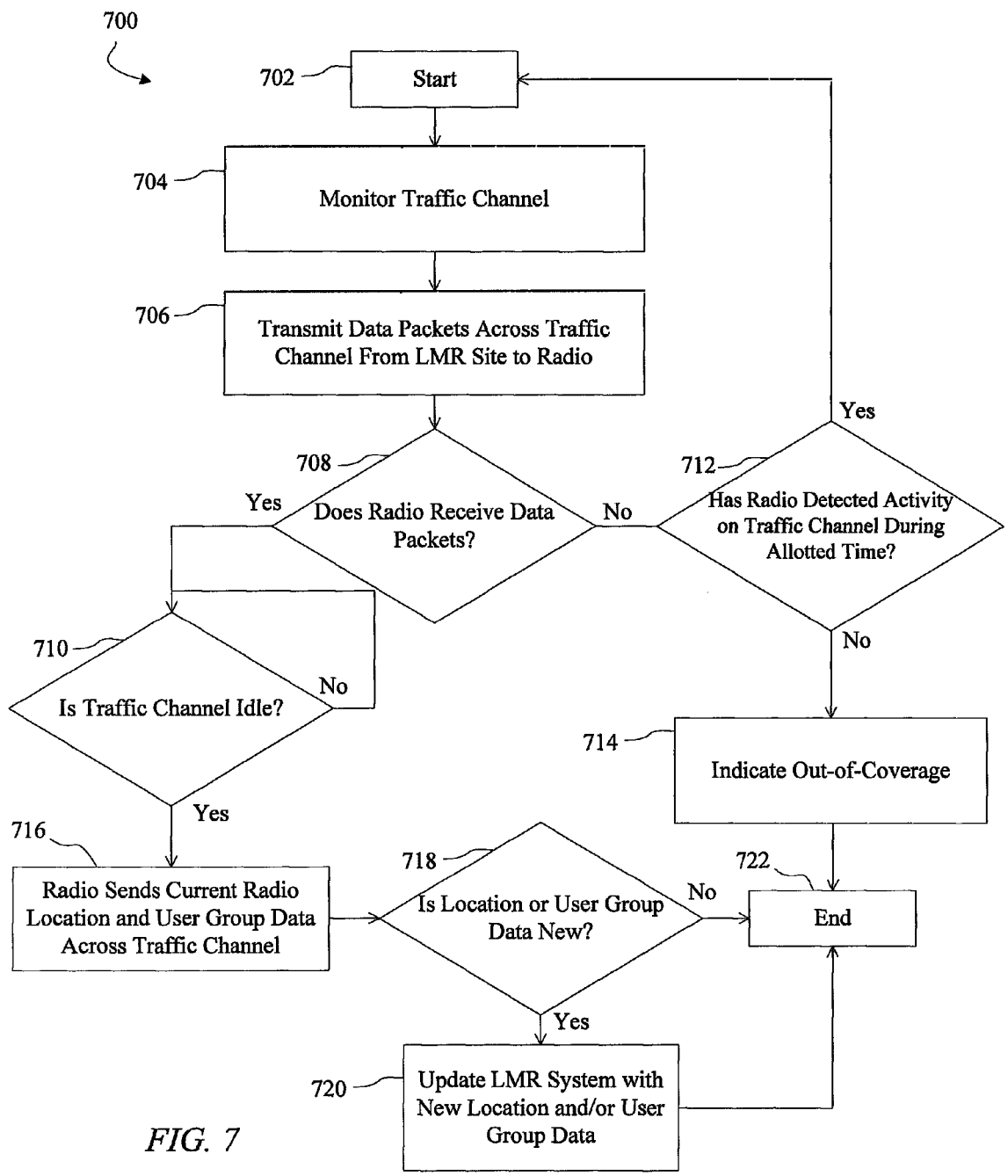
FIG. 7 illustrates an example embodiment of a method for providing mobility management and out-of-coverage indication in accordance with an embodiment of the present disclosure.

FIG. 7 is provided as a general description of one example embodiment for providing mobility management and out-of-coverage indication in a conventional land mobile radio system. The operations provided in this embodiment may be performed by various components within the LMR system. A flowchart 700 is shown in FIG. 7, wherein one iteration of the method starts at 702 and a traffic channel is monitored at 704. At 706, data packets are transmitted across the traffic channel from an LMR site to a radio. If the radio receives the data packets at 708, then at 710 the radio determines if the traffic channel is idle. However, if the radio does not receive the data packets at 708, then at 712 the radio determines if it has detected activity on the traffic channel during an allotted period of time. It should be appreciated that determining if the radio has detected activity on the traffic channel during an allotted amount time may be performed at any time and regardless of whether or not the radio receives the data packets; however, in the event that the radio does receive the data packets, the determination at 712 may be unnecessary in certain implementations. If the radio has detected activity (e.g., receipt of voice or data communication) on the traffic channel within the allotted amount of time, then the iteration ends or restarts and the radio continues to monitor the traffic channel; otherwise, the radio indicates that it is out-of-coverage at 714.

If the radio received the data packets at 708, the radio waits until the traffic channel is idle before sending current radio location and user group data across the traffic channel to the LMR site at 716. As previously stated, in some embodiments, the location data may be the site to which the radio is communicating, or coordinate data such as that provided by a Global Positioning System (GPS). If either the radio location data or the radio user group data, for example, sent to the LMR site is determined to be new (i.e., different than what was previously stored for the radio in the LMR system) at 718, then the LMR system is updated with the new location and/or user group data at 720; otherwise, the iteration ends (or starts over) at 722.

What is claimed is:

1. A method for providing mobility management and out-of-coverage indication in a conventional land mobile radio system, the method comprising:
   monitoring a traffic channel;
   transmitting data packets across the traffic channel from a first land mobile radio site in the system to a radio, the receipt of the data packets indicating that the radio is within coverage of the system;
   sending current radio data across the traffic channel from the radio to the first land mobile radio site when the traffic channel is idle;
   updating the system with the current radio data; and
   indicating that the radio is out-of-coverage if the radio does not detect activity on the traffic channel for an allotted amount of time.

2. The method as set forth in claim 1, wherein the radio data comprises at least one of radio location data or radio user group data.

3. The method as set forth in claim 1, wherein the current radio data is updated if the current radio data is different than previously-known radio data.

4. The method as set forth in claim 1, wherein indicating that the radio is out-of-coverage includes at least one of an audible indication, a vibrating indication, and a visual indication at the radio.

5. The method as set forth in claim 1, wherein updating the system with the current radio data comprises:
   storing the current radio data at a location associated with the first land mobile radio site;
   routing the current radio data to other land mobile radio sites in the system; and
   storing the current radio data in one or more locations associated with one or more of the other land mobile radio sites.

6. The method as set forth in claim 1, wherein updating the system with the current radio data comprises:
   storing the current radio data at a location associated with the first land mobile radio site;
   routing the current radio data to a home location site;
   storing the current radio data at a location associated with the home location site; and
   transmitting the current radio data from the home location site to at least one other land mobile radio site in the system.

7. The method as set forth in claim 6, wherein updating the system with the current radio data further comprises storing the current radio data in a location associated with the at least one other land mobile radio site.

8. The method as set forth in claim 1, wherein detecting activity on the traffic channel comprises the radio receiving at least one of voice communication or data communication across the traffic channel.

9. The method set forth in claim 1, further comprising:
  initiating a call from the radio, wherein the radio is affiliated with a user group and is in communication with the first land mobile radio site; and
  allocating one or more traffic channel resources at a second land mobile radio site enabling the user group.

10. A system for providing mobility management and out-of-coverage indication in a conventional land mobile radio system, the system comprising:
  one or more land mobile radio sites comprising:
    a visitor location register operable to communicate with a home location register;
    a site controller application operable to validate radio data;
    a channel controller application operable to allocate one or more traffic channels for the land mobile radio site, the traffic channels each being assigned to a specific user group by the site controller to enable radios affiliated with the user group to communicate;
    a repeater operable to communicate data with the channel controller; and
    a radio tower;
  a radio operable to monitor a traffic channel for activity, transmit radio data to a land mobile radio site when the traffic channel is idle, and indicate that the radio is out-of-coverage if the radio does not detect activity on the traffic channel for an allotted amount of time;
  a home location register operable to communicate with a visitor location register in each of the one or more land mobile radio sites;
  a network management system operable to configure the system; and
  a data router operable to transmit data within the system.

11. The system as set forth in claim 10, wherein the radio data comprises at least one of radio location data or radio user group data.

12. The system as set forth in claim 10, wherein the radio detects activity on the traffic channel by receiving at least one of a voice communication or a data communication across the traffic channel.

13. The system as set forth in claim 10, wherein the one or more land mobile radio sites further comprise a database operable to store radio data.

14. The system as set forth in claim 10, wherein the network management system is operable to set and change critical user group data, the critical user group data operable to determine allocation of a traffic channel for a land mobile radio site.

15. The system as set forth in claim 14, wherein the channel controller of the one or more land mobile radio sites is operable to allocate a traffic channel for a group call based on the critical user group data even if an interested radio in the critical user group is not located in the one or more land mobile radio sites.

16. The system as set forth in claim 10, wherein the system is operable to verify the operability of a radio.

17. The system as set forth in claim 10, wherein the system is operable to disable communication of a radio.

18. The system as set forth in claim 10, wherein the system is operable to enable communication of a radio.

19. The system as set forth in claim 10, wherein the system is operable to determine if a radio is in communication with one or more of the land mobile radio sites.

20. The system as set forth in claim 10, wherein the conventional land mobile radio system is in communication with a trunking land mobile radio system.

21. The system as set forth in claim 10, wherein the visitor location register, the network management system, and the home location register are further operable to detect communication failure between any two of the visitor location register, the network management system, and the home location register.

22. The system as set forth in claim 21, wherein the visitor location register may communicate directly with at least one other visitor location register upon detection of a communication failure between the visitor location register and the home location register.

23. The system as set forth in claim 21, wherein the home location register may queue radio data upon detection of a communication failure between the home location register and a visitor location register.

24. The system as set forth in claim 21, wherein radio data is synchronized between the home location register and visitor location register upon reestablishment of a failed communication.

25. A radio for use in a conventional land mobile radio system, the radio affiliated with a user group and operable to at least:
  monitor a traffic channel;
  receive data packets from the system, the receipt of the data packets indicating that the radio is within coverage of the system;
  transmit audio and data communication across the traffic channel;
  send radio data across the traffic channel when the traffic channel is idle; and
  indicate that the radio is out-of-coverage if the radio does not detect activity on the traffic channel for an allotted amount of time.

26. The radio as set forth in claim 25, wherein the radio data comprises at least one of radio location data or radio user group data.

27. The radio as set forth in claim 25, wherein the radio detects activity on the traffic channel by receiving at least one of a voice communication or a data communication across the traffic channel.

28. The radio as set forth in claim 25, wherein the indication that the radio is out-of-coverage includes at least one of an audible indication, a vibrating indication, and a visual indication at the radio.

29. The radio as set forth in claim 25, the radio further operable to:
  scan a plurality of traffic channels;
  detect activity on one or more of the scanned traffic channels; and
  transmit audio and data communication across the one or more scanned traffic channels on which activity was detected.

30. The radio as set forth in claim 25, the radio further operable to:
  scan a plurality of user groups;
  detect activity on one or more of the scanned user groups; and
  transmit audio and data communication to the one or more scanned user groups on which activity was detected.

31. The radio as set forth in claim 25, the radio further operable to place a call to other radios in the system, wherein the other radios are affiliated with the user group.

32. The radio as set forth in claim 25, the radio further operable to transmit radio data across the traffic channel in response to a change in the radio data.

33. The radio as set forth in claim 25, the radio further operable to transmit radio data across the traffic channel in response to a registration event.

34. The radio as set forth in claim 33, wherein a registration event may include at least one of a radio power on, a radio power off, a radio entering coverage of a land mobile radio site, changing a radio channel, initiating a "Request-to-Talk", transmission of an emergency alarm, transmission of a status message, and initiating a "Push-to-Talk".

\* \* \* \* \*